(12) United States Patent
Zhang

(10) Patent No.: US 10,207,447 B2
(45) Date of Patent: Feb. 19, 2019

(54) RAPID PROTOTYPING DEVICE AND METHOD THEREOF

(71) Applicants: INVENTEC APPLIANCES (PUDONG) CORPORATION, Shanghai (CN); Inventec Appliances Corp., New Taipei (TW)

(72) Inventor: Ze-Feng Zhang, Shanghai (CN)

(73) Assignee: INVENTEC APPLIANCES (PUDONG) CORPORATION, New Taipei (TW)

( * ) Notice: Subject to any disclaimer, the term of this patent is extended or adjusted under 35 U.S.C. 154(b) by 813 days.

(21) Appl. No.: 14/537,648

(22) Filed: Nov. 10, 2014

(65) Prior Publication Data

US 2016/0023395 A1     Jan. 28, 2016

(30) Foreign Application Priority Data

Jul. 25, 2014 (CN) .......................... 2014 1 0360544

(51) Int. Cl.
| | |
|---|---|
| B29C 47/86 | (2006.01) |
| B29C 47/92 | (2006.01) |
| B33Y 30/00 | (2015.01) |
| B29C 64/106 | (2017.01) |
| B29C 47/00 | (2006.01) |
| B29C 47/08 | (2006.01) |

(52) U.S. Cl.
CPC .......... *B29C 47/862* (2013.01); *B29C 47/92* (2013.01); *B29C 64/106* (2017.08); *B33Y 30/00* (2014.12); *B29C 47/0014* (2013.01); *B29C 47/0866* (2013.01); *B29C 2947/92076* (2013.01); *B29C 2947/92209* (2013.01); *B29C 2947/92409* (2013.01); *B29C 2947/92476* (2013.01); *B29C 2947/92571* (2013.01); *B29C 2947/92704* (2013.01); *B29C 2947/92904* (2013.01)

(58) Field of Classification Search
CPC .................................................... B29C 47/862
See application file for complete search history.

(56) References Cited

U.S. PATENT DOCUMENTS

2015/0165688 A1* 6/2015 Ho ...................... B29C 67/0088
                                                                    264/40.6

* cited by examiner

*Primary Examiner* — Larry W Thrower
(74) *Attorney, Agent, or Firm* — Richard A. Koske; Foster Pepper PLLC

(57) ABSTRACT

The invention provides a rapid prototyping device and method thereof. The rapid prototyping device comprises an environmental temperature sensor, a control module, a nozzle, and a heating device. The rapid prototyping method comprises following steps of: sensing an environmental temperature, acquiring a nozzle heating temperature according to the environmental temperature; and heating a nozzle till reaching the nozzle heating temperature. After the preparation of the rapid prototyping device, the environmental temperature sensor senses an environmental temperature, then the control module acquires a nozzle heating temperature based on the environmental temperature, and then the control module controls the heating device for heating the nozzle to the nozzle heating temperature. By the temperature compensating function of the present invention, the quality of the heating material ejected by the nozzle can be maintained.

8 Claims, 3 Drawing Sheets

RAPID PROTOTYPING DEVICE AND METHOD THEREOF

PRIORITY CLAIM

This application claims the benefit of the filing date of Chinese Patent Application No. 201410360544.9, filed Jul. 25, 2014, entitled "A Rapid Prototyping Device And Method Thereof," and the contents of which are hereby incorporated by reference in their entirety.

FIELD OF THE INVENTION

The present invention relates to a rapid prototyping device and method thereof, and more particularly, the present invention relates to a rapid prototyping device and method thereof which can sense the environmental temperature for adjusting the nozzle heating temperature.

BACKGROUND

In recent years, the development of rapid prototyping device really shocks to the manufacture industry. Rapid prototyping does not need huge devices or building, it only needs design drawings, rapid prototyping devices and materials. Anyone can create simple products with the rapid prototyping devices everywhere, including in an area with extreme climate.

The environmental temperature of the area with extreme climate is extremely changeable. The rapid prototyping device which is adapted to be used in the temperate region or the subtropical region cannot work properly in the area with extreme climate because the nozzle heating temperature of the rapid prototyping device is a fixed value, which will not be changed correspondingly according to the environmental temperature, and then induces the quality of the forming material, which is heated and ejected by the nozzle, cannot be maintained.

SUMMARY OF THE INVENTION

According to the statement mentioned above, the present invention provides a rapid prototyping device which can adjust the temperature of the nozzle according to the environmental temperature. The rapid prototyping device comprises: an environmental temperature sensor, a control module, a nozzle, and a heating device.

The environmental temperature sensor is electrically coupled to the control module for sensing an environmental temperature and outputting an environmental temperature signal to the control module, wherein the environmental temperature sensor can be a thermocouple, a platinum resistance, or a Negative Temperature Coefficient (NTC) thermistor. The control module is electrically coupled to the heating device, wherein the control module receives the environmental temperature signal and acquires a nozzle heating temperature according to the environmental temperature signal for outputting nozzle heating temperature signal to the heating device. The heating device is connected to the nozzle for heating the nozzle to the nozzle heating temperature according to the nozzle heating temperature signal, wherein the heating device can be a heating coil. The environmental temperature sensor is separated from the heating device with a predetermined distance to reduce the influence of the heating device on the environmental temperature sensor. The variation of the temperature sensed by environmental temperature sensor, which is caused by the heating device, is within a threshold, wherein the threshold can be 1° C.

The rapid prototyping device further comprises: a nozzle temperature sensor, a frame, a carrier, and a holding space. The nozzle temperature sensor is electrically coupled to the control module and disposed on the surface of the nozzle for sensing the temperature of the nozzle and outputting a nozzle temperature signal to the control module, wherein the nozzle temperature sensor can be a thermocouple, a platinum resistance, or a Negative Temperature Coefficient (NTC) thermistor. The carrier is used for carrying a forming material which is heated and outputted from the nozzle, and then the forming material will be set in the holding space comprised in the frame.

Additionally, the present invention further provides a rapid prototyping method, wherein the method comprises the following steps of: sensing an environmental temperature; acquiring a nozzle heating temperature according to the environmental temperature; and heating a nozzle to the nozzle heating temperature.

In practical application, the step of acquiring the nozzle heating temperature according to the environmental temperature further comprises: acquiring the environmental temperature; receiving an environmental temperature section table; and comparing the environmental temperature with the environmental temperature section table for acquiring the corresponding nozzle heating temperature.

According to the statement mentioned above, the present invention discloses a rapid prototyping device and method thereof, which uses environmental temperature sensor to sense the environmental temperature, and then inputs the environmental temperature signal to the control module. The control module acquires a nozzle heating temperature according to the environmental temperature signal, allows the nozzle to be heated to the nozzle heating temperature for compensating the nozzle temperature, and maintaining (not increasing) the temperature of the forming material which is heated and then outputted from the nozzle to prevent the nozzle to be influenced by the environmental temperature. Therefore, the quality of the heating material ejected by the nozzle can be maintained. Compared with the prior art, the present invention can prevent mistakes occurred in the printing process. Therefore, the quality and yield of the products created by the rapid prototyping device can be increased and the time cost can be decreased.

The advantages and spirits of the invention may be understood by the following recitations together with the appended drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
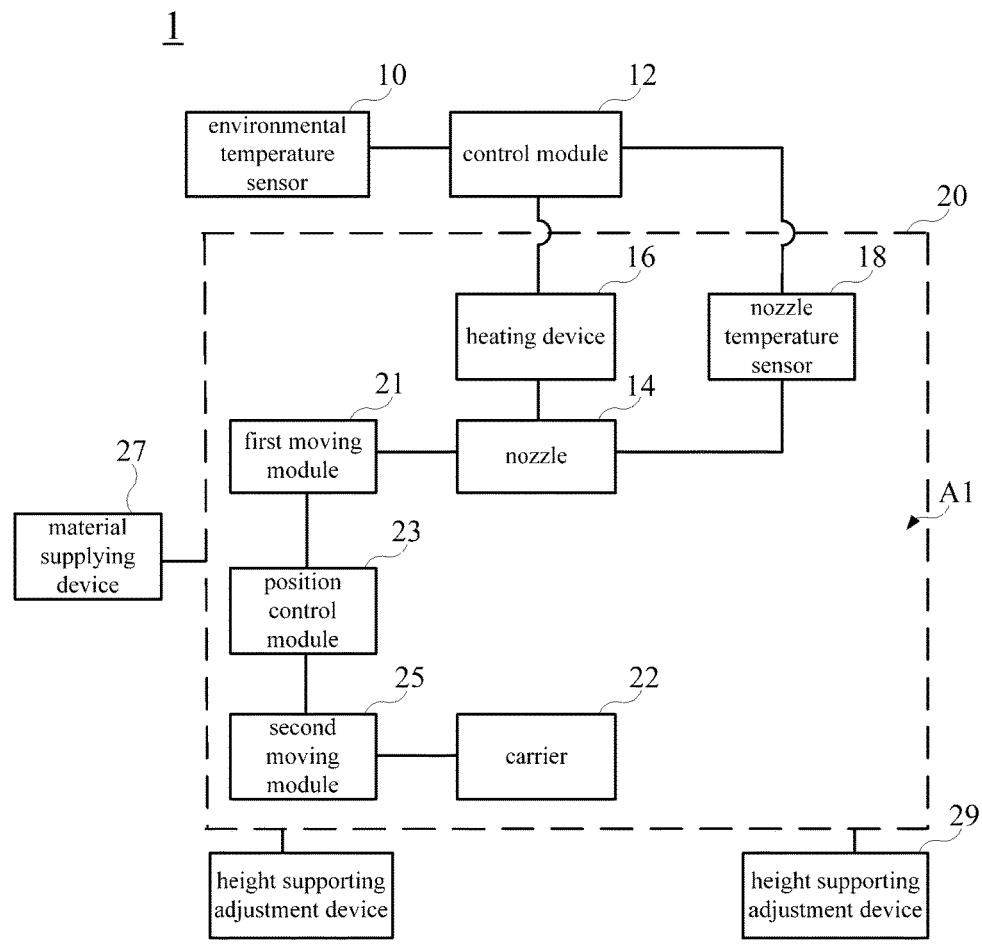
FIG. 1 shows the functional block diagram in an embodiment of the present invention.

Please refer to FIG. 1. FIG. 1 shows the functional block diagram in an embodiment of the present invention. The rapid prototyping device 1 of the present invention comprises an environmental temperature sensor 10, a control module 12, a nozzle 14, a heating device 16, a nozzle temperature sensor 18, a frame 20, a first moving module 21, a position control module 23, a second moving module 25, a material supplying device 27, a height supporting adjustment device 29, a carrier 22, and a holding space A1.

The rapid prototyping device 1 is using the nozzle 14 to output the melted material and controlling the movement of the nozzle 14, which allows the material to be cooled on the surface of the carrier 22 and then forms a three-dimensional structure having thickness. The following statement will explain the design of each device.

The frame 20 comprises the holding space A1. The frame 20 is used to well define the relative position of each module and each device of the present invention.

The carrier 22 is connected to the frame 20 and set beneath the holding space A1 for carrying a forming material outputted from the nozzle 14 and allowing the forming material to be formed to be an object on the carrier 22, wherein the forming material can be a PLA material or ABS material.

In this embodiment, the present invention comprises a second moving module 25. The second moving module 25 is connected to the carrier 22 for allowing the carrier 22 to move horizontally along the X-Y axis in the holding space. In some design, the carrier 22 can move along Z axis, and the second moving module 25 can be removed as well.

Corresponded to the carrier 22, the nozzle 14 is connected to the frame 20 through the first moving module 21 and set in the holding space A1 relatively to the top of the carrier 22. The first moving module 21 is used to drive the nozzle 14 to move three-dimensionally on the carrier 22.

The position control module 23 is electrically coupled to the first moving module 21 and the second moving module 25 for controlling the movement of the first moving module 21 and the second moving module 25. The designs of the first moving module 21 and the second moving module 25 are not limited to the present invention, which can be defined according to the demand of the user, wherein the first moving module 21 or the second moving module 25 can be removed selectively.

The present invention further comprises a material supplying device 27. In this embodiment, the material supplying device 27 is set on a wheel-shaped frame on the frame 20 for continuously supplying the material that needs to be heated to the nozzle 14, wherein the material supplying device is not limited to the statement mentioned above, the user can supply the material through another material supplying method as well. Additionally, the present invention also has a plurality of height supporting adjustment devices 29. The plurality of height supporting adjustment devices 29 are set in each corner of the bottom of the frame 20. Each height supporting adjustment device 29 can be adjusted respectively for changing the height of the frame 20 supported by the height supporting adjustment device 29, and then further changing the supported height of the rapid prototyping device 1. Therefore, the rapid prototyping device 1 can be disposed stably on the supporting surface of the frame 20, and the height supporting adjustment device 29 can be used to adjust the inclination angle of the frame 20 as well.

Furthermore, a heating device 16 is set on the surface of the nozzle 14 mentioned above or inside the nozzle 14 mentioned above. The heating device 16 is controlled by the control module 12 for heating the nozzle 14 and then allowing the material in the nozzle 14 can be melted.

Additionally, the present invention comprises an environmental temperature sensor 10. The environmental temperature sensor 10 is used to sense the environmental temperature and output an environmental temperature signal. In this embodiment, the environmental temperature sensor 10 is a thermocouple. However, the environmental temperature sensor 10 is not limited to the statement mentioned above. The environmental temperature sensor 10 also can be replaced by a platinum resistance, a Negative Temperature Coefficient (NTC) thermistor, or other kinds of temperature sensor which can provide temperature electronic signal. By the way, the environmental temperature mentioned above can be known as the temperature of the air of the space of the present invention.

The control module 12 is connected to the environmental temperature sensor 10 and the heating device 16 for controlling. In this embodiment, the control module 12 is a CPU and the corresponding devices thereof. However, the control module 12 is not limited to the statement mentioned above. In practical application, the control module 12 can be a single chip and the corresponding devices thereof.

Additionally, the present invention also comprises a nozzle temperature sensor 18, connected to the surface of the nozzle 14 for sensing the temperature of the nozzle 14 and then outputting a nozzle temperature signal. It is worth noting that in order to prevent the influence of the high temperature of the nozzle, the environmental temperature sensor 10 is separated from the nozzle 14 with a predetermined distance. More particularly, the design of the predetermined distance can allow the variation of the sensed temperature of the environmental temperature sensor 10 influenced by the heating device 16 to be within a threshold, wherein the threshold is 1° C. In this embodiment, the predetermined distance is at least 10 cm between the environmental temperature sensor 10 and the nozzle 14. If the present invention is allowed, the predetermined distance is better to be 20 cm to 50 cm. In another embodiment, a heat-insulating material can be set between the environmental temperature sensor 10 and the heating device 16 for reducing the influence of the temperature of the environmental temperature sensor 10 caused by the heating device 16 to be within a threshold. And the threshold is 1° C.

Upon each device of the present invention is explained distinctly, the following statement will explain the operation method of the present invention.

When the rapid prototyping device 1 is turned on, the environmental temperature sensor 10 senses the environmental temperature and then outputs an environmental temperature signal to the control module 12. Upon the control module 12 receives the environmental temperature signal, as shown in TAB. 1, the control module 12 compares the environmental temperature signal with an environmental temperature section table preset in the present invention for acquiring the corresponding nozzle heating temperature.

TAB. 1 shows the environmental temperature section and the corresponding nozzle heating temperature of the present invention. As shown in TAB. 1, the interval between each environmental temperature section is 5° C. When the environmental temperature sensed by the environmental temperature sensor 10 is 18° C., which is within the section of 15° C. to 20° C., the nozzle heating temperature corresponding to the section of 15° C. to 20° C. acquired by the control module 12 is 200° C.

Upon acquiring the nozzle heating temperature, the control module 12 outputs nozzle heating temperature signal to the heating device 16 for allowing the heating device 16 to heat the nozzle 14 to the nozzle heating temperature. Meanwhile, the nozzle temperature sensor 18 senses the real temperature of the nozzle 14 and outputs a nozzle temperature signal to the control module 12, which allows the control module 12 to know the real temperature of the nozzle 14 and control the power or heating time of the heating device 16 according to the nozzle temperature signal.

Please refer to FIG. 1 again. When printing, the position control module 23 respectively controls the first moving module 21 and the second moving module 25 for driving the nozzle 14 and the carrier 22; at the same time, the material supplying device 27 supplies the material to the nozzle 14 for allowing the nozzle 14 to output the forming material, and then piling up the forming material on the carrier 22 to form a three-dimensional work piece.

To summarize the statement mentioned above, the goal of controlling the nozzle heating temperature according to the environmental temperature of the present invention is compensating the nozzle temperature and maintaining the quality of the forming material heated and outputted from the nozzle 14, which prevents the forming material heated and outputted from the nozzle 14 to be influenced by the environmental temperature and then cooled down quickly.

Figure 2:
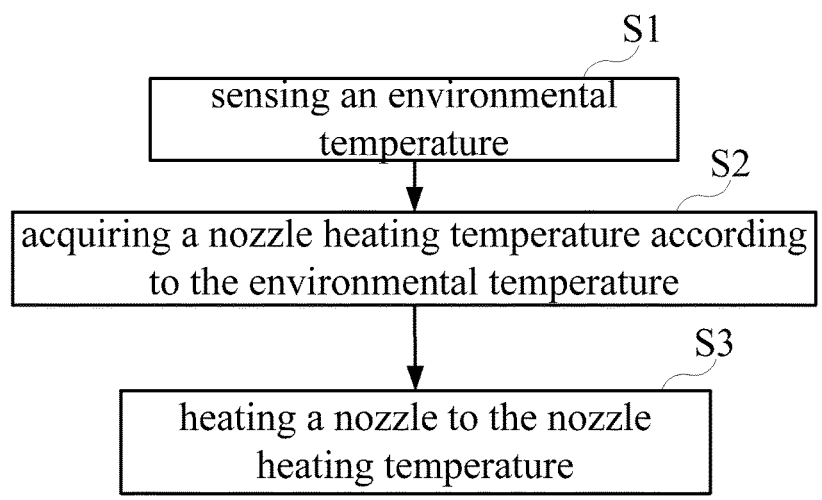
FIG. 2 shows the method flow chart in an embodiment of the present invention.
Figure 3:
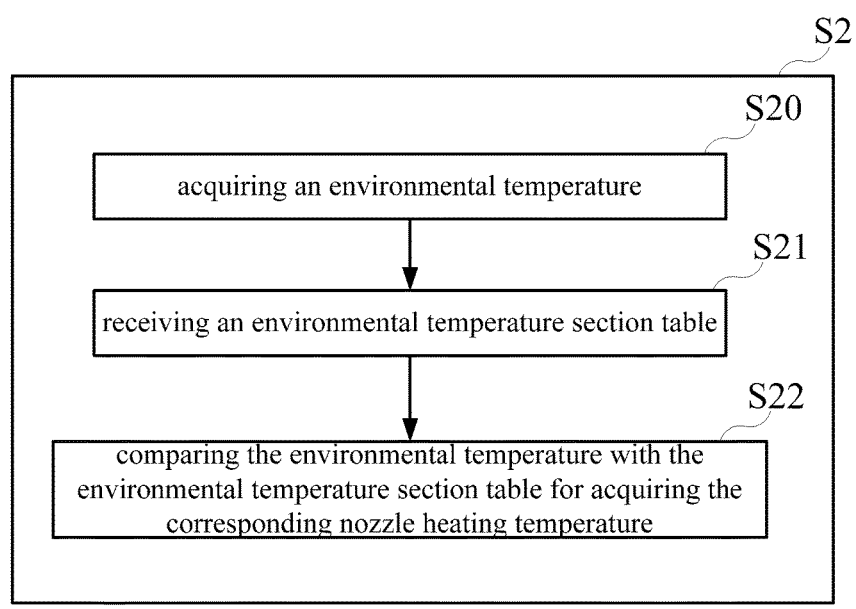
FIG. 3 shows the method flow chart in detail in an embodiment of the present invention.

Please refer to FIG. 2 and FIG. 3. FIG. 2 and FIG. 3 show a rapid prototyping method of the present invention, which is used to control the temperature of the nozzle of the rapid prototyping device, wherein the FIG. 2 shows the method flow chart in an embodiment of the present invention, and the FIG. 3 shows the method flow chart in detail in an embodiment of the present invention.

Before performing step S1 to step S3, a rapid prototyping device 1 needs to be prepared. In this embodiment, the rapid prototyping device 1 is the rapid prototyping device 1 mentioned in the above paragraphs.

As shown in FIG. 2, when the rapid prototyping device 1 is turned on and ready to work, the environmental temperature sensor 10 on the rapid prototyping device 1 starts to operate, and then performs the step S1: sensing an environmental temperature; in step S1, the environmental temperature sensor 10 senses the surrounding environmental temperature, and outputting an environmental temperature signal to the control module 12. Upon the control module 12 receives the environmental temperature signal, performs the step S2: acquiring a nozzle heating temperature according to the environmental temperature; in step S2, upon the control module 12 acquires the nozzle heating temperature, outputs a nozzle heating temperature signal to the heating device 16, and then performs step S3: heating a nozzle 14 to the nozzle heating temperature.

In an embodiment of the present invention, the step S2 further comprises step S20, S21, and S22, which are shown in FIG. 3.

The step S20 is acquiring an environmental temperature. Upon the environmental temperature sensor 10 senses the environmental temperature, outputs an environmental temperature signal to the control module 12. And upon the control module 12 receives the environmental temperature, performs step S21.

The step S21 is receiving an environmental temperature section table, wherein the environmental temperature section table is preset in the control module 12, and the environmental temperature section table comprises a plurality of environmental temperature sections, each environmental temperature section has the corresponding nozzle heating temperature respectively. The environmental temperature sections and the corresponding nozzle heating temperature will change when the forming material used by the rapid prototyping device 1 is different; wherein the environmental temperature section table can be preset in the control module 12 or defined by the user and then be entered in the control module 12.

Step S22 is comparing the environmental temperature with the environmental temperature section table for acquiring the corresponding nozzle heating temperature, as shown in TAB. 1, each environmental temperature section has a corresponding nozzle heating temperature respectively; the step S22 is comparing the environmental temperature acquired in step S20 with the environmental temperature section in TAB. 1 for finding the environmental temperature section corresponding to the environmental temperature acquired in step S20; upon the environmental temperature section corresponding to the environmental temperature acquired in step S20 is confirmed, acquiring the corresponding nozzle heating temperature according to the environmental temperature section corresponding to the environmental temperature, and then the control module 12 outputs a nozzle heating temperature signal to the heating device 16.

To summarize the statement mentioned above, the present invention discloses a rapid prototyping device and method thereof, which uses environmental temperature sensor to sense the environmental temperature, and then inputs the environmental temperature signal to the control module. The control module acquires a nozzle heating temperature according to the environmental temperature signal, allows the nozzle to be heated to the nozzle heating temperature for compensating the nozzle temperature, and maintaining (not increasing) the temperature of the forming material which is heated and then outputted from the nozzle to prevent the nozzle to be influenced by the environmental temperature. Therefore, the quality of the heating material ejected by the nozzle can be maintained.

Compared with the prior art, the rapid prototyping device and method thereof disclosed by the present invention can not only maintain the quality of the forming material heated and then outputted from the nozzle, but also prevent mistakes occur in the printing process. Therefore, the quality and yield of the products created by the rapid prototyping device can be increased and the time cost can be decreased.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

TABLE 1

| Environmental temperature (° C.) | 0~5 (° C.) | 5~10 (° C.) | 10~15 (° C.) | 15~20 (° C.) | 20~25 (° C.) | 25~30 (° C.) |
| --- | --- | --- | --- | --- | --- | --- |

TABLE 1-continued

| Nozzle heating temperature (° C.) | 203 (° C.) | 202 (° C.) | 201 (° C.) | 200 (° C.) | 199 (° C.) | 199 (° C.) |
| --- | --- | --- | --- | --- | --- | --- |

What is claimed is:

1. A rapid prototyping device comprising:
a nozzle;
an environmental temperature sensor, adapted for sensing an environmental temperature and outputting an environmental temperature signal, wherein the environmental temperature sensor is separated from the nozzle with a predetermined distance, and the predetermined distance is between 10 and 50 cm; and
a control module, electrically coupled to the environmental temperature sensor;
wherein the control module receives the environmental temperature signal and acquires a nozzle heating temperature according to the environmental temperature signal for controlling a temperature of the nozzle reaching the nozzle heating temperature.

2. The rapid prototyping device of claim 1, wherein the environmental temperature sensor comprises a thermocouple, a platinum resistance, or a Negative Temperature Coefficient (NTC) thermistor.

3. The rapid prototyping device of claim 1, further comprising:
a heating device, electrically coupled to the control module for the control module controlling the heating device, and connected the nozzle for heating the nozzle;
wherein the variation of the environmental temperature sensed by the environmental temperature sensor which is caused by the heating device is smaller than a threshold.

4. The rapid prototyping device of claim 3, wherein the threshold is 1° C.

5. The rapid prototyping device of claim 3, further comprising:
a nozzle temperature sensor, disposed on the surface of the nozzle and electrically coupled to the control module;
wherein the nozzle temperature sensor senses the temperature of the nozzle, and outputs a nozzle temperature signal to the control module for controlling the heating device.

6. The rapid prototyping device of claim 5, wherein the nozzle temperature sensor comprises a thermal couple, a platinum resistance, or a Negative Temperature Coefficient (NTC) thermistor.

7. The rapid prototyping device of claim 3, further comprising:
a carrier, for carrying a forming material outputted from the nozzle.

8. The rapid prototyping device of claim 7, further comprising:
a frame, for containing the nozzle, the heating device, and the carrier.

* * * * *

UNITED STATES PATENT AND TRADEMARK OFFICE
CERTIFICATE OF CORRECTION

PATENT NO. : 10,207,447 B2  
APPLICATION NO. : 14/537648  
DATED : February 19, 2019  
INVENTOR(S) : Ze-Feng Zhang Page 1 of 1

It is certified that error appears in the above-identified patent and that said Letters Patent is hereby corrected as shown below:

On the Title Page

At Column 1, (73), the Assignee data should be changed from:
"INVENTEC APPLIANCES (PUDONG) CORPORATION, New Taipei (TW)"

To:
--INVENTEC APPLIANCES (PUDONG) CORPORATION, Shanghai (CN);
INVENTEC APPLIANCES CORP., New Taipei City (TW)--

Signed and Sealed this
Thirtieth Day of June, 2020

Andrei Iancu
*Director of the United States Patent and Trademark Office*